United States Patent
Boom et al.

(10) Patent No.: US 11,258,658 B2
(45) Date of Patent: Feb. 22, 2022

(54) TECHNOLOGIES FOR MONITORING NETWORKED COMPUTING DEVICES USING DEADMAN TRIGGERS

(71) Applicant: Intel Corporation, Santa Clara, CA (US)

(72) Inventors: Douglas Boom, Portland, OR (US); Vilkas Visotski, Mesa, AZ (US); Nicholas Konkol, Beaverton, OR (US); Arjun Anantharam, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 613 days.

(21) Appl. No.: 16/023,749

(22) Filed: Jun. 29, 2018

(65) Prior Publication Data

US 2019/0044795 A1 Feb. 7, 2019

(51) Int. Cl.
| | | |
|---|---|---|
| *G06F 11/30* | (2006.01) |
| *H04L 41/0681* | (2022.01) |
| *H04L 41/0604* | (2022.01) |
| *H04L 47/50* | (2022.01) |
| *H04L 47/263* | (2022.01) |
| *H04L 41/0631* | (2022.01) |
| *H04L 43/0817* | (2022.01) |

(52) U.S. Cl.
CPC ...... *H04L 41/0681* (2013.01); *G06F 11/3006* (2013.01); *G06F 11/3055* (2013.01); *G06F 11/3089* (2013.01); *H04L 41/0627* (2013.01); *H04L 41/0631* (2013.01); *H04L 43/0817* (2013.01); *H04L 47/266* (2013.01); *H04L 47/50* (2013.01)

(58) Field of Classification Search
None
See application file for complete search history.

(56) References Cited

U.S. PATENT DOCUMENTS

| | | | | |
|---|---|---|---|---|
| 6,282,573 B1* | 8/2001 | Darago | ................... | G06F 21/10 |
| | | | | 709/229 |
| 2004/0205148 A1* | 10/2004 | Bae | ..................... | G06F 11/1425 |
| | | | | 709/213 |
| 2004/0222891 A1* | 11/2004 | Ehlers | ................ | G08B 21/0211 |
| | | | | 340/573.1 |

OTHER PUBLICATIONS

Intel Corporation et al., "Intelligent Platform Management Interface Specification", Second Generation, v2.0, Document Revision 1.1, Oct. 1, 2013, 644 pages.

* cited by examiner

*Primary Examiner* — Craig C Dorais
(74) *Attorney, Agent, or Firm* — Compass IP Law PC (57) ABSTRACT

Technologies for monitoring networked computing devices using deadman triggers includes a network interface controller (NIC) configured to collect a pin state of at least one deadman trigger pin associated with a deadman trigger and determine whether a triggering event associated with the deadman trigger has been detected as a result of the comparison. The NIC is further configured to generate, in response to a determination that the triggering event has been detected, a status packet that is usable to identify the detected triggering event associated with the deadman trigger. Additionally, the NIC is configured to issue a stop transmission command to each of a plurality of egress packet transmission queues of the NIC and insert the generated status packet into at least one of the plurality of egress packet transmission queues for transmission to a target computing device. Other embodiments are described herein.

25 Claims, 4 Drawing Sheets

TECHNOLOGIES FOR MONITORING NETWORKED COMPUTING DEVICES USING DEADMAN TRIGGERS

BACKGROUND

Modern computing devices have become ubiquitous tools for personal, business, and social uses. As such, many modern computing devices have become integral parts of day-to-day life for many consumers. For example, various network infrastructures (e.g., public/private data centers, cloud infrastructures, carrier networks, etc.) can include a few to thousands of network computing devices (e.g., routers, servers, servers, blades, sleds, etc.) which are relied upon to perform at certain levels (e.g., quality of service levels required by a service level agreement) to yield income for the provider of the services for which they are deployed. As such, it is imperative that any loss of certain operational functionality be discovered as soon as possible. For example, an administrator will generally want to be made aware of certain system impairments, such as an unexpected power-down operation, the theft of a component of the network computing device (e.g., memory, processor, power supply, microprocessor, etc.), an excessive temperature, etc.

Traditionally, technologies for detecting such system impairments include using a specialized microcontroller embedded on a motherboard of the network computing device, commonly referred to as a baseboard management controller (BMC), which monitors various different types of sensors built into the network computing device to detect such system impairments. However, the addition of the array of sensors and BMC controller presently used to implement the existing technologies can add additional costs. As such, BMCs are not commonly found in lower-end systems with limited features implemented to reduce their costs. Further, such implementations take of valuable real estate on the motherboards, as well as the increased power and firmware necessary to run the BMC and array of sensors. There are additional concerns related to the security of such implementations, arising from the concerns in regard to the BMCs as a closed infrastructure and the susceptibility to denial of service and remote access attacks.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
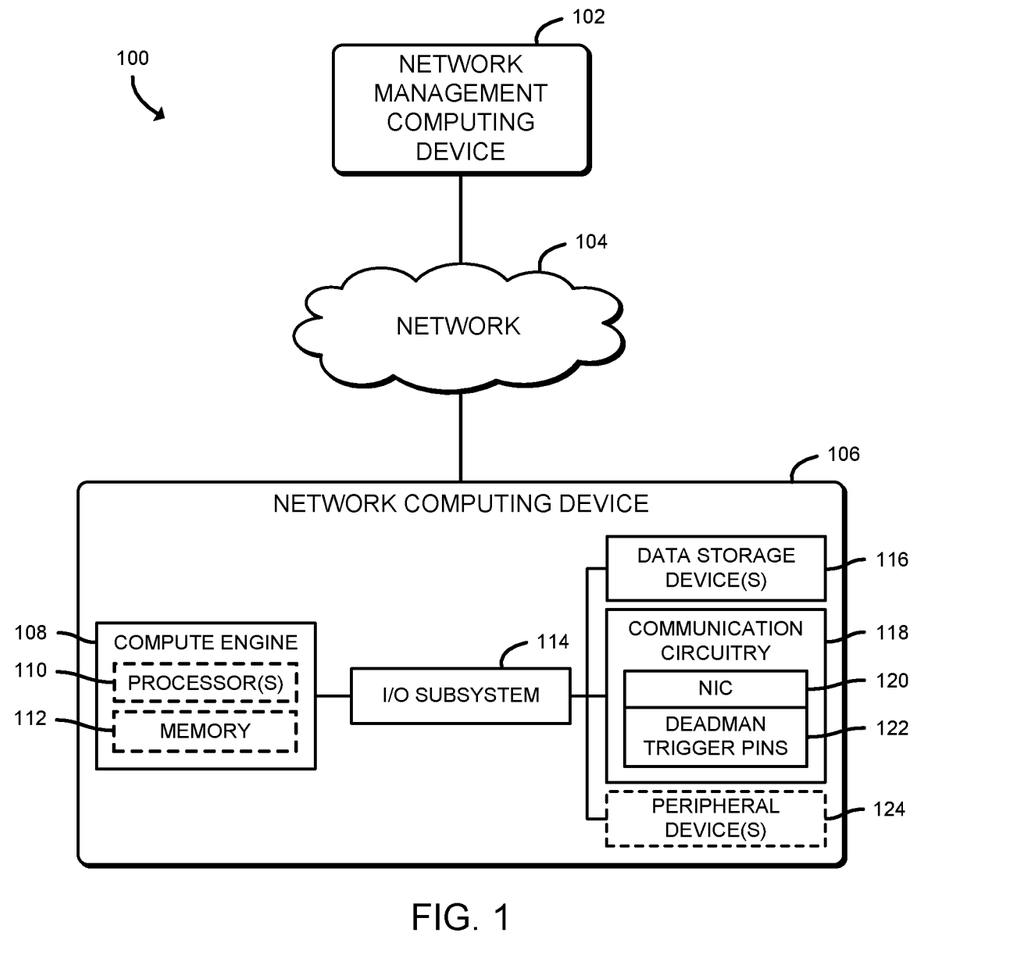
FIG. 1 is a simplified block diagram of at least one embodiment of a system for monitoring networked computing devices using deadman triggers that includes a network computing device and a network management computing device.

Referring now to FIG. 1, in an illustrative embodiment, a system 100 for monitoring networked computing devices using deadman triggers includes a network computing device 106 communicatively coupled to a network management computing device 102 via a network 104. In use, as will be described in further detail below, the network computing device 106 monitors the state of a series of virtual and/or physical pins (e.g., the deadman trigger pins 122 of the illustrative network computing device 106) which have been associated with one or more deadman triggers. To do so, for example, one or more of the deadman trigger pins are communicatively coupled via a physical wire or a logical communication channel to a component of the network computing device 106, such as the network interface controller (NIC) (e.g., the NIC 120), a processor (e.g., one of the processors 110 of the compute engine 108), a power supply (not shown), or other component (e.g., a housing (not shown) of the network computing device 106).

Upon detecting a triggering event associated with one or more of the deadman trigger pins, the network computing device 106 transmits a network packet to the network management computing device 102 that includes information indicating which deadman triggering event has been detected. In other words, unlike present technologies which leverage a more expensive and obtrusive baseboard management controller (BMC) coupled to a NIC, the functions described herein can be performed by the NIC 120 of the network computing device 106, such that the notification packets may be transmitted in an expedient fashion. For example, in some embodiments, the media access controller (MAC) of the NIC 120 may be configured to store a preconfigured deadman packet in on-chip memory saved to non-volatile memory (e.g., the memory 112) for later use. As such, detection of the triggering event associated with the preconfigured deadman packet can be immediately pushed to the front of an egress packet transmission queue without system-level interaction or BMC interaction as employed in present technologies.

The network computing device 106 may be embodied as any type of computation or computer device capable of performing the functions described herein, including, without limitation, a server (including, e.g., stand-alone server, rack-mounted server, blade server, etc.), a sled (e.g., a compute sled, an accelerator sled, a storage sled, a memory sled, etc.), a switch (e.g., a disaggregated switch, a rack-mounted switch, a standalone switch, a fully managed switch, a partially managed switch, a full-duplex switch, a half-duplex communication mode enabled switch, etc.), a router, an enhanced NIC (e.g., a host fabric interface (HFI)), a distributed computing system, or any other combination of compute/storage device(s) capable of performing the functions described herein. The illustrative network computing device 106 includes a compute engine 108, an I/O subsystem 114, one or more data storage devices 116, communication circuitry 118, and, in some embodiments, one or more peripheral devices 124. It should be appreciated that the network computing device 106 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 108 may be embodied as any type of device or collection of devices capable of performing the various compute functions as described herein. In some embodiments, the compute engine 108 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 108 may include, or may be embodied as, one or more processors 110 (i.e., one or more central processing units (CPUs)) and memory 112.

The processor(s) 110 may be embodied as any type of processor capable of performing the functions described herein. For example, the processor(s) 110 may be embodied as one or more single-core processors, multi-core processors, digital signal processors (DSPs), microcontrollers, or other processors or processing/controlling circuits. In some embodiments, the processor(s) 110 may be embodied as, include, or otherwise be coupled to an FPGA (e.g., reconfigurable circuitry), an application specific integrated circuit (ASIC), reconfigurable hardware or hardware circuitry, or other specialized hardware to facilitate performance of the functions described herein.

The memory 112 may be embodied as any type of volatile memory, non-volatile memory, or any type of data storage element capable of performing the functions described herein. It should be appreciated that the memory 112 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 108 is communicatively coupled to other components of the network computing device 106 via the I/O subsystem 114, which may be embodied as circuitry and/or multiple hardware/software components to facilitate input/output operations with the processor 110, the memory 112, and other components of the network computing device 106. For example, the I/O subsystem 114 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 114 may form a portion of a SoC and be incorporated, along with one or more of the processor 110, the memory 112, and other components of the network computing device 106, on a single integrated circuit chip.

The one or more data storage devices 116 may be embodied as any type of storage device(s) configured for short-term or long-term storage of data, such as, for example, memory devices and circuits, memory cards, hard disk drives, solid-state drives, or other data storage devices. Each data storage device 116 may include a system partition that stores data and firmware code for the data storage device 116. Each data storage device 116 may also include an operating system partition that stores data files and executables for an operating system.

The communication circuitry 118 may be embodied as any communication circuit, device, or collection thereof, capable of enabling communications between the network computing device 106 and the network management computing device 102, as well as any network communication enabling devices, such as an access point, router, etc., to allow communication to/from the network computing device 106. Accordingly, the communication circuitry 118 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. It should be appreciated that, in some embodiments, the communication circuitry 118 may include specialized circuitry, hardware, or combination thereof to perform pipeline logic (e.g., hardware-based algorithms) for performing the functions described herein, including processing network packets, making routing decisions, performing computational functions, etc.

In some embodiments, performance of one or more of the functions of communication circuitry 118 as described herein may be performed by specialized circuitry, hardware, or combination thereof of the communication circuitry 118, which may be embodied as a SoC or otherwise form a portion of a SoC of the network computing device 106 (e.g., incorporated on a single integrated circuit chip along with a processor 110, the memory 112, and/or other components of the network computing device 106). Alternatively, in some embodiments, the specialized circuitry, hardware, or combination thereof may be embodied as one or more discrete processing units of the network computing device 106, each of which may be capable of performing one or more of the functions described herein.

The illustrative communication circuitry 118 includes a network interface controller (NIC) 120 and a series of deadman trigger pins 122. The NIC 120, also commonly referred to as a host fabric interface (HFI) in some embodiments (e.g., high-performance computing (HPC) environments), may be embodied as any type of firmware, hardware, software, or any combination thereof that facilities communications access between the network computing device 106 and a network (e.g., the network 104). For example, the NIC 120 may be embodied as one or more add-in-boards, daughtercards, network interface cards, controller chips, chipsets, or other devices that may be used by the network computing device 106. In some embodiments, the NIC 120 may be embodied as part of a SoC that includes one or more processors, or included on a multichip package that also contains one or more processors. Accordingly, in some embodiments, the NIC 120 may include other components which are not shown, such as a local processor, an accelerator device (e.g., any type of specialized hardware on which offload operations can be performed faster and/or more efficiently than is possible on the local general-purpose processor), and/or a local memory local to the NIC 120. In such embodiments, the local processor and/or the accelerator device of the NIC 120 may be capable of performing one or more of the functions described herein.

The deadman trigger pins 122 may be embodied as logical pins within a SoC and/or physical pins in a standalone NIC 120 solution, depending on the embodiment. Irrespective of the embodiment, each of the deadman trigger pins 122 are configured to provide a state that can be monitored by the NIC 120. For example, the deadman trigger pin 122 states may be any binary state usable to identify an active state of a component associated with the deadman trigger pin(s) 122, such as active high, active low, active on pulse, active when continual, etc.

The one or more peripheral devices 124 may include any type of device that is usable to input information into the network computing device 106 and/or receive information from the network computing device 106. The peripheral devices 124 may be embodied as any auxiliary device usable to input information into the network computing device 106, such as a keyboard, a mouse, a microphone, a barcode reader, an image scanner, etc., or output information from the network computing device 106, such as a display, a speaker, graphics circuitry, a printer, a projector, etc. It should be appreciated that, in some embodiments, one or more of the peripheral devices 124 may function as both an input device and an output device (e.g., a touchscreen display, a digitizer on top of a display screen, etc.). It should be further appreciated that the types of peripheral devices 124 connected to the network computing device 106 may depend on, for example, the type and/or intended use of the network computing device 106. Additionally or alternatively, in some embodiments, the peripheral devices 124 may include one or more ports, such as a USB port, for example, for connecting external peripheral devices to the network computing device 106.

The network management computing device 102 may be may be embodied as any type of computation or computer device capable of performing the functions described herein, including, without limitation, a server (including, e.g., stand-alone server, rack-mounted server, blade server, etc.), a sled (e.g., a compute sled, an accelerator sled, a storage sled, a memory sled, etc.), a switch (e.g., a disaggregated switch, a rack-mounted switch, a standalone switch, a fully managed switch, a partially managed switch, a full-duplex switch, a half-duplex communication mode enabled switch, etc.), an enhanced NIC (e.g., an HFI), a distributed computing system, or any other combination of compute/storage device(s) capable of performing the functions described herein. While not illustratively shown, it should be appreciated that network management computing device 102 includes similar and/or like components to those of the illustrative network computing device 106. As such, figures and descriptions of the like components are not repeated herein for clarity of the description with the understanding that the description of the corresponding components provided above in regard to the network computing device 106 applies equally to the corresponding components of the network management computing device 102. Of course, it should be appreciated that network management computing device 102 may include additional and/or alternative components, depending on the embodiment.

Depending on the embodiment of the network management computing device 102 and the network 104 in which the network computing device 106 is deployed, it should be appreciated that at least a portion of the functions described herein as being performed by the network management computing device 102 may be an extension of existing control-plane hardware and/or software of any computing device which is capable of controlling resources of the network fabric and associated hardware (e.g., the network computing device 106, switches, routers, etc.), such as a network controller, a software defined network (SDN) controller, a network functions virtualization (NFV) manager and network orchestrator (MANO), etc.

The network 104 may be embodied as any type of wired or wireless communication network, including but not limited to a wireless local area network (WLAN), a wireless personal area network (WPAN), an edge network (e.g., a multi-access edge computing network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate the transmission of network traffic through the network 104.

Figure 2:
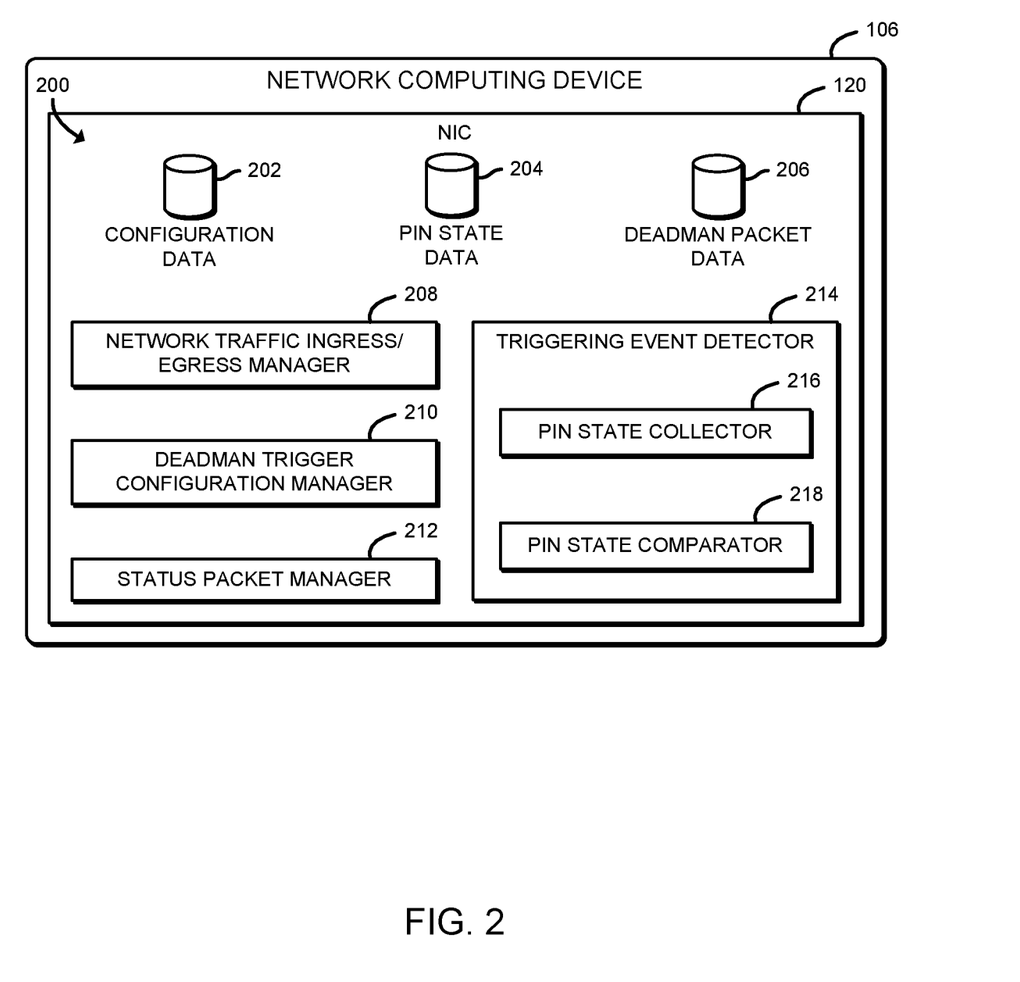
FIG. 2 is a simplified block diagram of at least one embodiment of an environment of the network computing device of the system of FIG. 1.

Referring now to FIG. 2, in use, the network computing device 106 establishes an illustrative environment 200 during operation. The illustrative environment 200 includes a network traffic ingress/egress manager 208, a deadman trigger configuration manager 210, a status packet manager 212, and a triggering event detector 214. The various components of the environment 200 may be embodied as hardware, firmware, software, or a combination thereof. As such, in some embodiments, one or more of the components of the environment 200 may be embodied as circuitry or collection of electrical devices (e.g., network traffic ingress/egress management circuitry 208, deadman trigger configuration management circuitry 210, status packet management circuitry 212, triggering event detection circuitry 214, etc.).

It should be appreciated that, in such embodiments, one or more of the network traffic ingress/egress management circuitry 208, the deadman trigger configuration management circuitry 210, the status packet management circuitry 212, and the triggering event detection circuitry 214 may form a portion of one or more of the compute engine 108, the I/O subsystem 114, the communication circuitry 118 (i.e., the NIC 120, the deadman trigger pins 122, etc.), and/or other components of the network computing device 106. Additionally, in some embodiments, one or more of the illustrative components may form a portion of another component and/or one or more of the illustrative components may be independent of one another. Further, in some embodiments, one or more of the components of the environment 200 may be embodied as virtualized hardware components or emulated architecture, which may be established and maintained by the compute engine 108, the NIC 120, or other components of the network computing device 106. It should be appreciated that the network computing device 106 may include other components, sub-components, modules, sub-modules, logic, sub-logic, and/or devices commonly found in a computing device, which are not illustrated in FIG. 2 for clarity of the description.

In the illustrative environment 200, the network computing device 106 additionally includes configuration data 202, pin state data 204, and deadman packet data 206, each of which may be accessed by the various components and/or sub-components of the network computing device 106. Additionally, it should be appreciated that in some embodiments the data stored in, or otherwise represented by, each of the configuration data 202, the pin state data 204, and the deadman packet data 206 may not be mutually exclusive relative to each other. For example, in some implementations, data stored in the configuration data 202 may also be stored as a portion of one or more of the pin state data 204 and/or the deadman packet data 206. As such, although the various data utilized by the network computing device 106 is described herein as particular discrete data, such data may be combined, aggregated, and/or otherwise form portions of a single or multiple data sets, including duplicative copies, in other embodiments.

The network traffic ingress/egress manager 208, which may be embodied as hardware, firmware, software, virtualized hardware, emulated architecture, and/or a combination thereof as discussed above, is configured to receive inbound and route/transmit outbound network traffic. To do so, the network traffic ingress/egress manager 208 is configured to facilitate inbound/outbound network communications (e.g., network traffic, network packets, network flows, etc.) to and from the network computing device 106. For example, the network traffic ingress/egress manager 208 is configured to manage (e.g., create, modify, delete, etc.) connections to physical and virtual network ports (i.e., virtual network interfaces) of the network computing device 106 (e.g., via the NIC 120 of the communication circuitry 118), as well as the ingress/egress buffers/queues associated therewith.

The deadman trigger configuration manager 210, which may be embodied as hardware, firmware, software, virtualized hardware, emulated architecture, and/or a combination thereof as discussed above, is configured to manage configuration of the deadman triggers. To do so, the deadman trigger configuration manager 210 is configured to manage the association between the deadman trigger and a triggering event, such as a component of the network computing device 106 being removed. Additionally, the deadman trigger configuration manager 210 is configured manage which of the one or more deadman trigger pins are to be associated with the deadman trigger. It should be appreciated that, in some embodiments, more than one deadman trigger pin may be associated a deadman trigger. Further, depending on the embodiment, one or more of the deadman trigger pins may be virtual, or logical, pins (i.e., not physical pins). Accordingly, it should be further appreciated that the deadman trigger configuration manager 210 is configured to, in such embodiments, manage the configuration of the virtual deadman trigger pins as well as physical deadman trigger pins (e.g., the deadman trigger pins 122 of FIG. 1).

The deadman trigger configuration manager 210 is also configured to manage configuration settings for a status packet (i.e., the deadman triggering event indicating packet) for which detection of the triggering event will initiate the transmission of. For example, in some embodiments, the deadman trigger may be configured to transmit a pregenerated network packet (i.e., a deadman trigger packet). Accordingly, the deadman trigger configuration manager 210 is configured to generate the deadman trigger packet with the appropriate information (e.g., identifying information of the triggering event associated with the deadman trigger) and store the generated deadman trigger packet (e.g., in volatile memory). Alternatively, in other embodiments, the deadman trigger may be configured to insert the appropriate deadman trigger identifying information into an outgoing network packet. In such embodiments, the deadman trigger configuration manager 210 is configured to manage an insertion offset usable to insert the status into a particular location (e.g., in the header or payload) of the outbound network packet.

Additionally, the deadman trigger configuration manager 210 is configured to manage a transmission queue insertion rule for the status packet. For example, the deadman trigger configuration manager 210 may be configured to insert the status packet into every egress packet transmission queue (e.g., a high priority), the first egress packet transmission queue available to transmit the status packet (e.g., a low priority), or some other transmission queue insertion rule. In some embodiments, the deadman trigger configuration manager 210 may be configured to determine the transmission queue insertion rule based on an associated priority level of the deadman trigger. It should be appreciated that, depending on the embodiment, at least a portion of the deadman trigger configuration information may be stored in volatile memory, while another portion of the deadman trigger configuration information may be stored in non-volatile memory (e.g., depending on the type of deadman trigger configuration information being stored). In some embodiments, at least a portion of the deadman trigger configuration information may be stored in the configuration data 202.

The status packet manager 212, which may be embodied as hardware, firmware, software, virtualized hardware, emulated architecture, and/or a combination thereof as discussed above, is configured to manage the status packets (e.g., deadman packets, network packets with status information inserted therein, etc.). To do so, the status packet manager 212 is configured to, as applicable, generate a deadman packet based on the deadman packet configuration information described previously (e g., managed by the deadman trigger configuration manager 210). Additionally, the status packet manager 212 is configured to store the generated deadman packet (e.g., in volatile memory). In some embodiments, the generated deadman packet may be stored in the deadman packet data 206.

The status packet manager 212 is further configured to insert, as applicable, the deadman trigger identifying information into an outbound network packet. As described previously, such information may be inserted at a predetermined location, such as a particular field in a header or at a particular offset of a payload of the network packet. It should be appreciated that, in some embodiments, the receiving device (e.g., the network management computing device 102 of FIG. 1) may be configured to receive regular updates on the deadman trigger pin states, such that the receiving device can determine whether a triggering event has been detected. In other words, the triggering event detection process (e.g., described herein as being performed by the pin state comparator 218 of the triggering event detector 214) may be offloaded to the receiving device. In such embodiments, the status packet manager 212 is configured to insert the applicable deadman trigger pin state information into the appropriate outbound network packet.

The status packet manager 212 is additionally configured to issue a stop transmission command to each of a plurality of egress packet transmission queues of the NIC, as well as manage the insertion of the status packet(s) into the applicable egress packet transmission queue(s) based on the transmission queue insertion rule. Accordingly, it should be appreciated that the status packet manager 212 has access to the transmission queues (i.e., the transmission queue for each media access control (MAC) port (not shown) of the NIC 120) to ensure all outbound routes are available to send the status packet in the shortest amount of time. To do so, the status packet manager 212 is configured to access an injection site at the port for each status packet to be placed at the head of the queue. In some embodiments, depending on the transmission queue insertion rule, the status packet manager 212 may be further configured to replicate the previously generated deadman packet, such as may be required to insert the deadman packet into more than one egress packet transmission queue.

The triggering event detector 214, which may be embodied as hardware, firmware, software, virtualized hardware, emulated architecture, and/or a combination thereof as discussed above, is configured to monitor the deadman trigger pin states to detect a triggering event. To do so, the illustrative triggering event detector 214 includes a pin state collector 216 and a pin state comparator 218. The pin state collector 216 is configured to determine the state of any of the one or more deadman trigger pins (e.g., the deadman trigger pins 122 of FIG. 1) at a given point in time. In some embodiments, the pin state information of the deadman trigger pins may be stored in the pin state data 204.

The pin state comparator 218 is configured to compare the present state of the deadman trigger pins to an active state of each of the deadman trigger pins to determine whether a triggering event is detected. It should be appreciated that the present state of the deadman trigger pins may be high or low at a given point in time. As described previously, the active state may be active high, active low, active on pulse, active when continual, etc. As also described previously, each triggering event of a deadman trigger is associated with one or more physical and/or logical deadman trigger pins. Accordingly, the pin state comparator 218 is configured to compare the present state of those one or more deadman trigger pins associated with a deadman trigger with an expected state of each of those one or more deadman trigger pins to determine whether a triggering event has been detected.

Figure 3:
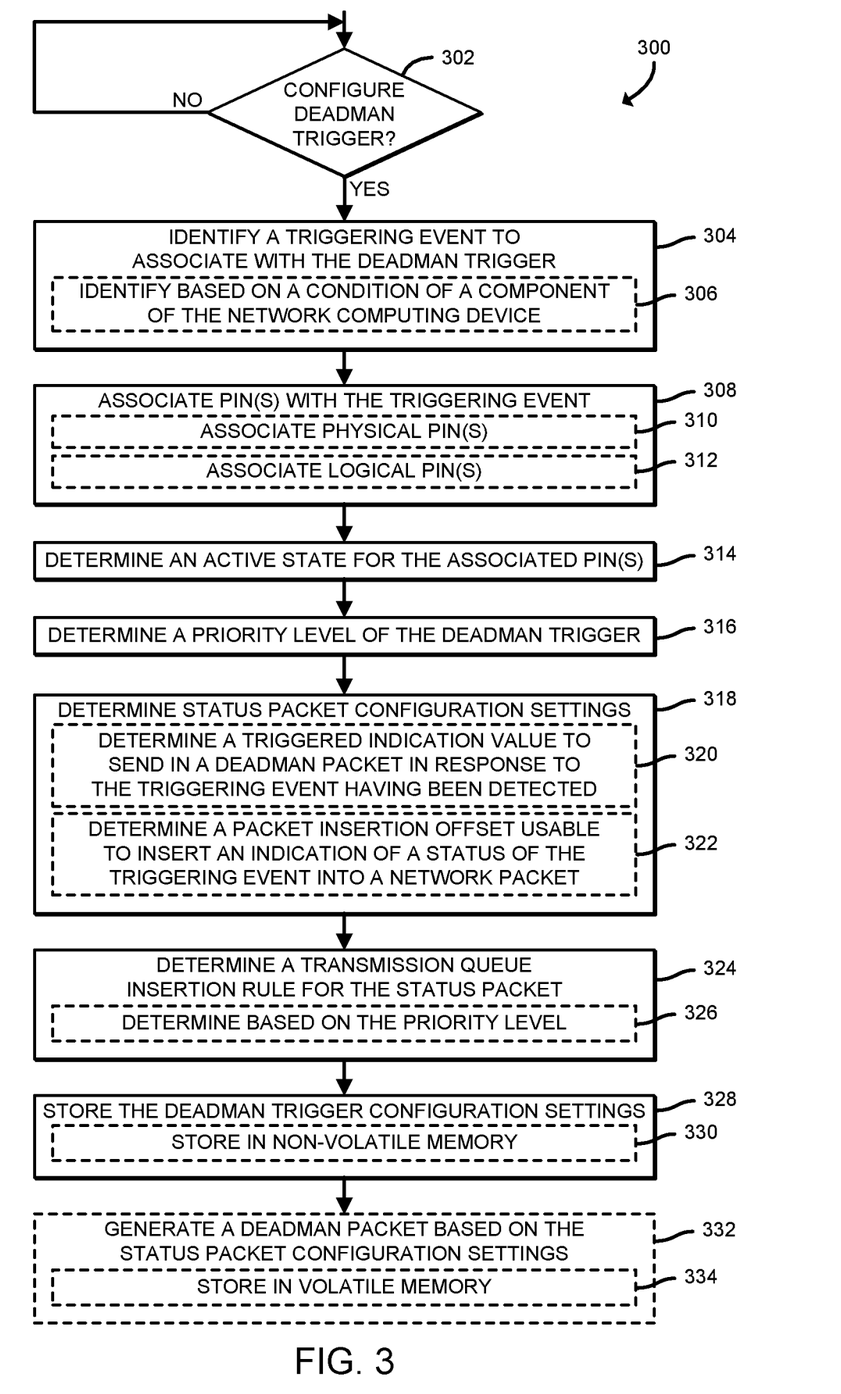
FIG. 3 is a simplified flow diagram of at least one embodiment of a method for configuring a deadman trigger that may be executed by the network computing device of FIGS. 1 and 2.

Referring now to FIG. 3, a method 300 for configuring a deadman trigger is shown which may be executed by a computing device (e.g., the network computing device 106 of FIGS. 1 and 2), or more particularly by a NIC of the computing device (e.g., the NIC 120 of the communication circuitry 118 of the network computing device 106). The method 300 begins with block 302, in which the NIC 120 determines whether to configure a deadman trigger (e.g., on startup, upon prompt by a user, etc.). Depending on the embodiment, the deadman trigger configuration may be setup by a user, driver, BIOS, preset configuration, etc. In an illustrative example in which the BIOS performs the configuration, the BIOS may configured the deadman triggers and either lock the configuration from further changes or leave the configuration open for user and driver changes, as necessary. It should be appreciated that BIOS locking would allow OEMs to create a custom solution that users should not be able to modify and break; whereas open systems could leave configuration for the driver to configure which would be useful in a multiple OEM environment. It should be further appreciated that, due to certain notifications needing to be transmitted as fast as possible, the amount of configurable areas within the packet may need to be kept to a minimum.

If a deadman trigger is to be configured, the method 300 advances to block 304, in which the NIC 120 identifies a triggering event to associated with the deadman trigger. As described previously, the triggering event may be any type of event that is detectable by a deadman trigger (i.e., an active state), such as power loss (e.g., power supply failure or removal), chassis intrusion, asset theft (e.g., CPU, memory, etc.), or removal, damage, or other monitor able condition affecting some. Accordingly, in block 306, the NIC 120 may identify the triggering event based on a condition of a component of the network computing device 106. In block 308, the NIC 120 determines which pins to associate with the triggering event. As described previously, the deadman trigger pins (e.g., the deadman trigger pins 122 of FIG. 1) may be embodied as logical pins within a SoC and/or physical pins in a standalone NIC 120 solution, depending on the embodiment. Accordingly, in block 310, the NIC 120 may associate one or more physical pins. Additionally or alternatively, in block 312, the NIC 120 may associate one or more logical pins.

In block 314, the NIC 120 determines an active state for the associated pin(s). As described previously, the active state of deadman trigger pin may be active high, active low, active on pulse, active when continual, etc. In block 316, the NIC 120 determines a priority level of the deadman trigger. For example, the triggering event of the deadman trigger may be associated with a high risk component (e.g., power loss, an expensive component, confidential data storage, etc.) such that the priority of that triggering event is higher relative to another triggering event (e.g., an Ethernet cable no longer connected, a chassis intrusion, etc.).

In block 318, the NIC 120 determines status packet configuration settings. As also described previously, the status packet may be a dedicated deadman packet or an outbound network packet with the status inserted therein (e.g., a state of a deadman trigger pin inserted at a predetermined offset of the outbound network packet). Accordingly, in block 320, the NIC 120 may be configured to determine a triggered indication value to send in a deadman packet in response to the triggering event having been detected. Alternatively, in block 322, the NIC 120 may be configured to determine a packet insertion offset usable to identify an insertion location to insert a status of the triggering event or the deadman trigger pin(s) (i.e., the triggered indication value).

In block 324, the NIC 120 is configured to determine a transmission queue insertion rule for the status packet. To do so, in block 326, the NIC 120 may determine the transmission queue insertion rule based on the determined priority level, in some embodiments. In block 328, the NIC 120 stores the deadman trigger configuration settings (i.e., the triggering event, the associated pin(s), the active state(s), the priority level, the status packet configuration settings, and the transmission queue insertion rule). It should be appreciated that the deadman trigger configuration settings may include additional and/or alternative configuration settings in other embodiments, such as a message to send with the status packet, an IP address of a target recipient (e.g., the network management computing device 102), or other information that may be useful to identify a characteristic of the deadman trigger. In some embodiments, in block 330, the NIC 120 may store the deadman trigger configuration settings in non-volatile memory of the network computing device 106. In such embodiments in which the status packet corresponds to a dedicated deadman packet, in block 332, the NIC 120 generates a deadman packet based on the status packet configuration setting. Additionally, in some embodiments, in block 334, the NIC 120 may store the generated deadman packet in volatile memory of the network computing device 106.

Figure 4:
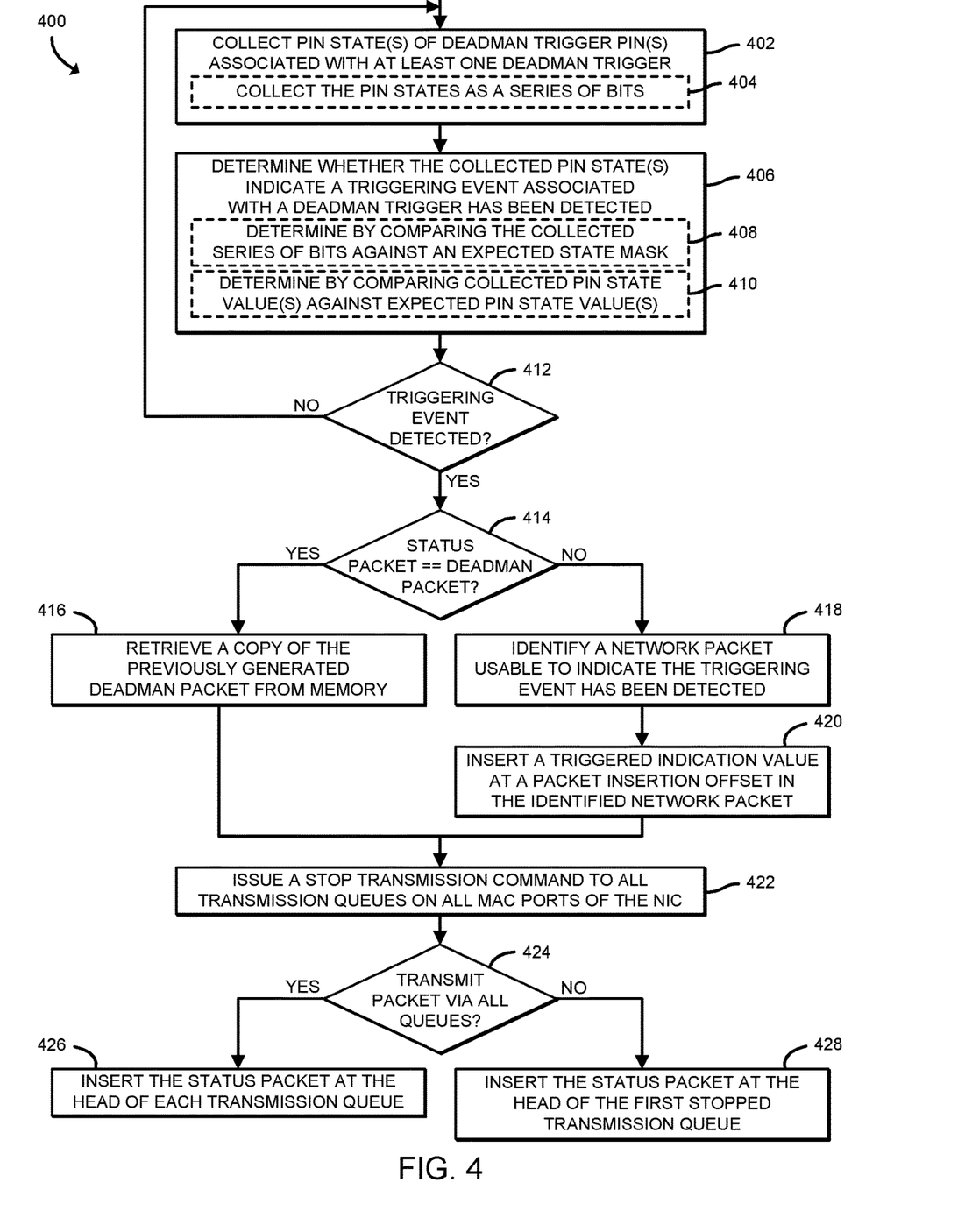
FIG. 4 is a simplified flow diagram of at least one embodiment of a method for responding to an event triggering a deadman trigger that may be executed by the network computing device of FIGS. 1 and 2.

Referring now to FIG. 4, a method 400 for responding to an event triggering a deadman trigger is shown which may be executed by a computing device (e.g., the network computing device 106 of FIGS. 1 and 2), or more particularly by a NIC of the computing device (e.g., the NIC 120 of the communication circuitry 118 of the network computing device 106). The method 400 begins with block 402, in which the NIC 120 collects the pin state of each deadman trigger pin associated with at least one deadman trigger. For example, in block 404, the NIC 120 may collect the pin states as a series of bits for the one or more deadman triggers, in some embodiments. As described previously, each deadman trigger may be associated with one or more deadman trigger pins, which may be physical, logical, or a combination thereof, depending on the embodiment. Accordingly, in some embodiments, the NIC 120 may be configured to detect the state of the deadman trigger pin(s) associated with a particular deadman trigger on a predetermined interval (e.g., a single or multiple clock cycles) or detect the state of all of the deadman trigger pins on the predetermined interval.

In block 406, the NIC 120 determines whether the collected pin state(s) indicate a triggering event associated with a deadman trigger has been detected. To do so, for example, in block 408, the NIC 120 may determine whether the triggering event has been detected by comparing the collected series of bits against an expected state mask (e.g., preconfigured based on the deadman trigger configuration settings of each configured deadman trigger). Alternatively, in another example, in block 410, the NIC 120 may determine whether the triggering event has been detected by comparing the collected pin state value(s) of the deadman trigger pins against the respective expected pin state value(s) individually.

In block 412, the NIC 120 determines whether a triggering event has been detected. If not, the method 400 return to block 402 to collect the pin state(s) again; otherwise, the method 400 advances to block 414. As described previously, the NIC 120 is configured to send a status packet (i.e., the deadman triggering event indicating packet) in response to having detected a triggering event. As also described previously, the status packet may be a dedicated deadman packet or an outbound network packet with the status inserted therein (e.g., a state of a deadman trigger pin inserted at a predetermined offset of the outbound network packet). Accordingly, in block 414, the NIC 120 determines whether to send the status packet as a deadman packet (i.e., as opposed to inserting the status into a network packet at a predetermined offset) based on the deadman trigger configuration information.

If the NIC 120 determines to send a deadman packet, the method 400 branches to block 416. In block 416, the NIC 120 retrieves a copy of the previously generated deadman packet from its storage location in memory before the method continues to block 422, which is described below. Otherwise, referring back to block 414, if the NIC 120 determines not to send a deadman packet, the method 400 branches to block 418. In block 418, the NIC 120 identifies a network packet usable to indicate the triggering event has been detected. Additionally, in block 420, the NIC 120 inserts the triggered indication value at a packet insertion offset in the identified network packet before advancing to block 422.

In block 422, the NIC 120 issues a stop transmission command to each egress packet transmission queues on all MAC ports of the NIC 120. As described previously, the deadman trigger configuration information includes an insertion rule (e.g., based on the associated priority level) which is usable to determine whether the status packet is to be transmitted via all transmission queues (e.g., higher priority) or a first available transmission queue (e.g., lower priority). Accordingly, in block 424, the NIC 120 determines whether the status packet (i.e., the deadman packet or the identified network packet) is to be transmitted via all transmission queues (i.e., each MAC port) based on the associated insertion rule for the deadman trigger to which the triggering event corresponds. If so, the method 400 branches to block 426, in which the NIC 120 inserts the status packet at the head of each transmission queue (i.e., of each MAC port) for transmission to a target computing device (e.g., the network management computing device 102 of FIG. 1). Otherwise, the method 400 branches to block 428, in which the NIC 120 inserts the status packet at the head of the first stopped transmission queue for transmission to a target computing device (e.g., the network management computing device 102 of FIG. 1). Accordingly, it should be appreciated that upon receipt of a status packet, the target computing device is able to identify which component of which network computing device 106 is presently affected and respond accordingly.

EXAMPLES

Illustrative examples of the technologies disclosed herein are provided below. An embodiment of the technologies may include any one or more, and any combination of, the examples described below.

Example 1 includes a network interface controller (NIC) for monitoring networked computing devices using deadman triggers, the NIC comprising at least one dead man trigger pin; triggering event detection circuitry to collect a pin state of the at least one deadman trigger pin associated with a deadman trigger, compare the collected pin state of the deadman trigger to an expected pin state of the deadman trigger, and determine whether a triggering event associated with the deadman trigger has been detected as a result of the comparison; and status packet management circuitry to generate, in response to a determination that the triggering event has been detected, a status packet, wherein the status packet includes information usable to identify the detected triggering event associated with the deadman trigger.

Example 2 includes the subject matter of Example 1, and wherein the status packet management circuitry is further to (i) issue a stop transmission command to each of a plurality of egress packet transmission queues of the NIC and (ii) insert the generated status packet into at least one of the plurality of egress packet transmission queues for transmission to a target computing device.

Example 3 includes the subject matter of any of Examples 1 and 2, and further including deadman trigger configuration management circuitry to configure one or more deadman triggers, and wherein to configure each of the one or more deadman triggers comprises to identify the triggering event to be associated with the deadman trigger; associate one or more deadman trigger pins with the triggering event; determine an active state for each of the associated one or more deadman trigger pins; determine a priority level of the deadman trigger; determine status packet configuration settings usable to determine how to generate the status packet; determine a transmission queue insertion rule usable to determine how to insert the generated status packet into at least one of the plurality of egress packet transmission queues; and store the deadman trigger configuration settings in non-volatile memory of the network computing device.

Example 4 includes the subject matter of any of Examples 1-3, and wherein to identify the triggering event comprises to identify the triggering event based on a condition of a component of the network computing device.

Example 5 includes the subject matter of any of Examples 1-4, and wherein to associate the one or more deadman trigger pins with the triggering event comprises to associate one or more physical deadman trigger pins with the triggering event.

Example 6 includes the subject matter of any of Examples 1-5, and wherein to associate the one or more deadman trigger pins with the triggering event comprises to associate one or more logical deadman trigger pins with the triggering event.

Example 7 includes the subject matter of any of Examples 1-6, and wherein to insert the generated status packet into at least one of the plurality of egress packet transmission queues comprises to insert the generated status packet into one or more of the plurality of egress packet transmission queues based on the insertion rule.

Example 8 includes the subject matter of any of Examples 1-7, and wherein the status packet management circuitry is further to generate, in response to a determination that the status packet configuration settings indicate to transmit a dedicated deadman packet, the dedicated deadman packet; and store the dedicated deadman packet in volatile memory of the network computing device.

Example 9 includes the subject matter of any of Examples 1-8, and wherein to generate the status packet comprises to retrieve the dedicated deadman packet previously stored in the volatile memory.

Example 10 includes the subject matter of any of Examples 1-9, and wherein to generate the status packet comprises to (i) identify a network packet usable to indicate the triggering event has been detected and (ii) insert a triggered indication value at a packet insertion offset in the identified network packet, wherein the triggered indication value is usable to identify the triggering event.

Example 11 includes the subject matter of any of Examples 1-10, and wherein to insert the generated status packet into at least one of the plurality of egress packet transmission queues comprises to insert the identified network packet at a head of the first stopped egress packet transmission queue.

Example 12 includes the subject matter of any of Examples 1-11, and wherein to insert the generated status packet into at least one of the plurality of egress packet transmission queues comprises to insert a copy of the generated status packet at a head of each of the plurality of egress packet transmission queues.

Example 13 includes one or more machine-readable storage media comprising a plurality of instructions stored thereon that, in response to being executed, cause a network interface controller (NIC) to collect a pin state of at least one deadman trigger pin of the NIC, wherein the at least one deadman trigger pin is associated with a deadman trigger; compare the collected pin state of the deadman trigger to an expected pin state of the deadman trigger; determine whether a triggering event associated with the deadman trigger has been detected as a result of the comparison; and generate, in response to a determination that the triggering event has been detected, a status packet, wherein the status packet includes information usable to identify the detected triggering event associated with the deadman trigger.

Example 14 includes the subject matter of Example 13, and wherein the plurality of instructions further cause the NIC to issue a stop transmission command to each of a plurality of egress packet transmission queues of the NIC; and insert the generated status packet into at least one of the plurality of egress packet transmission queues for transmission to a target computing device.

Example 15 includes the subject matter of any of Examples 13 and 14, and wherein the plurality of instructions further cause the NIC to configure one or more deadman triggers, and wherein to configure each of the one or more deadman triggers comprises to identify the triggering event to be associated with the deadman trigger; associate one or more deadman trigger pins with the triggering event; determine an active state for each of the associated one or more deadman trigger pins; determine a priority level of the deadman trigger; determine status packet configuration settings usable to determine how to generate the status packet; determine a transmission queue insertion rule usable to determine how to insert the generated status packet into at least one of the plurality of egress packet transmission queues; and store the deadman trigger configuration settings in non-volatile memory of the network computing device.

Example 16 includes the subject matter of any of Examples 13-15, and wherein to identify the triggering event comprises to identify the triggering event based on a condition of a component of the network computing device.

Example 17 includes the subject matter of any of Examples 13-16, and wherein to associate the one or more deadman trigger pins with the triggering event comprises to associate one or more physical or logical deadman trigger pins with the triggering event.

Example 18 includes the subject matter of any of Examples 13-17, and wherein to insert the generated status packet into at least one of the plurality of egress packet transmission queues comprises to insert the generated status packet into one or more of the plurality of egress packet transmission queues based on the insertion rule.

Example 19 includes the subject matter of any of Examples 13-18, and wherein the plurality of instructions further cause the NIC to generate, in response to a determination that the status packet configuration settings indicate to transmit a dedicated deadman packet, the dedicated deadman packet; and store the dedicated deadman packet in volatile memory of the network computing device.

Example 20 includes the subject matter of any of Examples 13-19, and wherein to generate the status packet comprises to retrieve the dedicated deadman packet previously stored in the volatile memory.

Example 21 includes the subject matter of any of Examples 13-20, and wherein to generate the status packet comprises to (i) identify a network packet usable to indicate the triggering event has been detected and (ii) insert a triggered indication value at a packet insertion offset in the identified network packet, wherein the triggered indication value is usable to identify the triggering event.

Example 22 includes the subject matter of any of Examples 13-21, and wherein to insert the generated status packet into at least one of the plurality of egress packet transmission queues comprises to one of (i) insert the identified network packet at a head of the first stopped egress packet transmission queue or (ii) insert a copy of the generated status packet at a head of each of the plurality of egress packet transmission queues.

Example 23 includes a network interface controller (NIC) for monitoring networked computing devices using deadman triggers, the NIC comprising circuitry for collecting a pin state of at least one deadman trigger pin associated with a deadman trigger, means for comparing the collected pin state of the deadman trigger to an expected pin state of the deadman trigger, and means for determining whether a triggering event associated with the deadman trigger has been detected as a result of the comparison; and means for generating, in response to a determination that the triggering event has been detected, a status packet, wherein the status packet includes information usable to identify the detected triggering event associated with the deadman trigger.

Example 24 includes the subject matter of Example 23, and further including means for issuing a stop transmission command to each of a plurality of egress packet transmission queues of the NIC, and means for inserting the generated status packet into at least one of the plurality of egress packet transmission queues for transmission to a target computing device.

Example 25 includes the subject matter of any of Examples 23 and 24, and further including means for configuring one or more deadman triggers, and wherein the means for configuring each of the one or more deadman triggers comprises means for identifying the triggering event to be associated with the deadman trigger; means for associating one or more deadman trigger pins with the triggering event; means for determining an active state for each of the associated one or more deadman trigger pins; means for determining a priority level of the deadman trigger; means for determining status packet configuration settings usable to determine how to generate the status packet; means for determining a transmission queue insertion rule usable to determine how to insert the generated status packet into at least one of the plurality of egress packet transmission queues; and means for storing the deadman trigger configuration settings in non-volatile memory of the network computing device.

The invention claimed is:

1. A network interface controller (NIC) for monitoring networked computing devices using deadman triggers, the NIC comprising:
   at least one deadman trigger pin;
   triggering event detection circuitry to:
      collect a pin state of the at least one deadman trigger pin associated with a deadman trigger,
      compare the collected pin state of the deadman trigger to an expected pin state of the deadman trigger, and
      determine whether a triggering event associated with the deadman trigger has been detected as a result of the comparison; and
   status packet management circuitry to:
      generate, in response to a determination that the triggering event has been detected, a status packet, wherein the status packet includes information usable to identify the detected triggering event associated with the deadman trigger.

2. The NIC of claim 1, wherein the status packet management circuitry is further to (i) issue a stop transmission command to each of a plurality of egress packet transmission queues of the NIC and (ii) insert the generated status packet into at least one of the plurality of egress packet transmission queues for transmission to a target computing device.

3. The NIC of claim 1, further comprising deadman trigger configuration management circuitry to configure one or more deadman triggers, and wherein to configure each of the one or more deadman triggers comprises to:
   identify the triggering event to be associated with the deadman trigger;
   associate one or more deadman trigger pins with the triggering event;
   determine an active state for each of the associated one or more deadman trigger pins;
   determine a priority level of the deadman trigger;
   determine status packet configuration settings usable to determine how to generate the status packet;
   determine a transmission queue insertion rule usable to determine how to insert the generated status packet into at least one of the plurality of egress packet transmission queues; and
   store deadman trigger configuration settings in non-volatile memory of a network computing device.

4. The NIC of claim 3, wherein to identify the triggering event comprises to identify the triggering event based on a condition of a component of the network computing device.

5. The NIC of claim 3, wherein to associate the one or more deadman trigger pins with the triggering event comprises to associate one or more physical deadman trigger pins with the triggering event.

6. The NIC of claim 3, wherein to associate the one or more deadman trigger pins with the triggering event comprises to associate one or more logical deadman trigger pins with the triggering event.

7. The NIC of claim 3, wherein to insert the generated status packet into at least one of the plurality of egress packet transmission queues comprises to insert the generated status packet into one or more of the plurality of egress packet transmission queues based on the insertion rule.

8. The NIC of claim 1, wherein the status packet management circuitry is further to:
   generate, in response to a determination that status packet configuration settings indicate to transmit a dedicated deadman packet, the dedicated deadman packet; and
   store the dedicated deadman packet in volatile memory of a network computing device.

9. The NIC of claim 8, wherein to generate the status packet comprises to retrieve the dedicated deadman packet previously stored in the volatile memory.

10. The NIC of claim 1, wherein to generate the status packet comprises to (i) identify a network packet usable to indicate the triggering event has been detected and (ii) insert a triggered indication value at a packet insertion offset in the identified network packet, wherein the triggered indication value is usable to identify the triggering event.

11. The NIC of claim 10, wherein to insert the generated status packet into at least one of the plurality of egress packet transmission queues comprises to insert the identified network packet at a head of a first stopped egress packet transmission queue.

12. The NIC of claim 1, wherein to insert the generated status packet into at least one of the plurality of egress packet transmission queues comprises to insert a copy of the generated status packet at a head of each of the plurality of egress packet transmission queues.

13. A network interface controller (NIC) for monitoring networked computing devices using deadman triggers, the NIC comprising:
   circuitry for collecting a pin state of at least one deadman trigger pin associated with a deadman trigger,
   means for comparing the collected pin state of the deadman trigger to an expected pin state of the deadman trigger, and
   means for determining whether a triggering event associated with the deadman trigger has been detected as a result of the comparison; and
   means for generating, in response to a determination that the triggering event has been detected, a status packet, wherein the status packet includes information usable to identify the detected triggering event associated with the deadman trigger.

14. The NIC of claim 13, further comprising means for configuring one or more deadman triggers, and wherein the means for configuring one or more deadman triggers comprises:
   means for identifying the triggering event to be associated with the deadman trigger;
   means for associating one or more deadman trigger pins with the triggering event;
   means for determining an active state for each of the associated one or more deadman trigger pins;
   means for determining a priority level of the deadman trigger;
   means for determining status packet configuration settings usable to determine how to generate the status packet;
   means for determining a transmission queue insertion rule usable to determine how to insert the generated status packet into at least one of the plurality of egress packet transmission queues; and
   means for storing deadman trigger configuration settings in non-volatile memory of a network computing device.

15. One or more machine-readable storage media comprising a plurality of instructions stored thereon that, in response to being executed, cause a network interface controller (NIC) to:
   collect a pin state of at least one deadman trigger pin of the NIC, wherein the at least one deadman trigger pin is associated with a deadman trigger;
   compare the collected pin state of the deadman trigger to an expected pin state of the deadman trigger;
   determine whether a triggering event associated with the deadman trigger has been detected as a result of the comparison; and
   generate, in response to a determination that the triggering event has been detected, a status packet, wherein the status packet includes information usable to identify the detected triggering event associated with the deadman trigger.

16. The one or more machine-readable storage media of claim 15, wherein the plurality of instructions further cause the NIC to:
   issue a stop transmission command to each of a plurality of egress packet transmission queues of the NIC; and
   insert the generated status packet into at least one of the plurality of egress packet transmission queues for transmission to a target computing device.

17. The one or more machine-readable storage media of claim 15, wherein the plurality of instructions further cause the NIC to configure one or more deadman triggers, and wherein to configure each of the one or more deadman triggers comprises to:
   identify the triggering event to be associated with the deadman trigger;
   associate one or more deadman trigger pins with the triggering event;
   determine an active state for each of the associated one or more deadman trigger pins;
   determine a priority level of the deadman trigger;
   determine status packet configuration settings usable to determine how to generate the status packet;
   determine a transmission queue insertion rule usable to determine how to insert the generated status packet into at least one of the plurality of egress packet transmission queues; and
   store deadman trigger configuration settings in non-volatile memory of a network computing device.

18. The one or more machine-readable storage media of claim 17, wherein to identify the triggering event comprises to identify the triggering event based on a condition of a component of the network computing device.

19. The one or more machine-readable storage media of claim 17, wherein to associate the one or more deadman trigger pins with the triggering event comprises to associate one or more physical or logical deadman trigger pins with the triggering event.

20. The one or more machine-readable storage media of claim 17, wherein to insert the generated status packet into at least one of the plurality of egress packet transmission queues comprises to insert the generated status packet into one or more of the plurality of egress packet transmission queues based on the insertion rule.

21. The one or more machine-readable storage media of claim 15, wherein the plurality of instructions further cause the NIC to:
   generate, in response to a determination that status packet configuration settings indicate to transmit a dedicated deadman packet, the dedicated deadman packet; and
   store the dedicated deadman packet in volatile memory of a network computing device.

22. The one or more machine-readable storage media of claim 21, wherein to generate the status packet comprises to retrieve the dedicated deadman packet previously stored in the volatile memory.

23. The one or more machine-readable storage media of claim 13, wherein to generate the status packet comprises to (i) identify a network packet usable to indicate the triggering event has been detected and (11) insert a triggered indication value at a packet insertion offset in the identified network packet, wherein the triggered indication value is usable to identify the triggering event.

24. The one or more machine-readable storage media of claim 23, wherein to insert the generated status packet into at least one of the plurality of egress packet transmission queues comprises to one of (i) insert the identified network packet at a head of a first stopped egress packet transmission queue or (ii) insert a copy of the generated status packet at a head of each of the plurality of egress packet transmission queues.

25. The NIC of claim 13, further comprising:
means for issuing a stop transmission command to each of a plurality of egress packet transmission queues of the NIC, and
means for inserting the generated status packet into at least one of the plurality of egress packet transmission queues for transmission to a target computing device.

\* \* \* \* \*